(12) United States Patent
Tryndin et al.

(10) Patent No.: US 12,136,249 B2
(45) Date of Patent: Nov. 5, 2024

(54) GLARE MITIGATION USING IMAGE CONTRAST ANALYSIS FOR AUTONOMOUS SYSTEMS AND APPLICATIONS

(71) Applicant: NVIDIA Corporation, Santa Clara, CA (US)

(72) Inventors: Igor Tryndin, Fremont, CA (US); Abhishek Bajpayee, Santa Clara, CA (US); Yu Wang, Mountain View, CA (US); Hae-Jong Seo, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 324 days.

(21) Appl. No.: 17/549,418

(22) Filed: Dec. 13, 2021

(65) Prior Publication Data

US 2023/0186593 A1     Jun. 15, 2023

(51) Int. Cl.
| | |
|---|---|
| *G06V 10/60* | (2022.01) |
| *B60Q 1/14* | (2006.01) |
| *G06V 10/25* | (2022.01) |
| *G06V 20/58* | (2022.01) |
| *H05B 47/125* | (2020.01) |

(52) U.S. Cl.
CPC .......... *G06V 10/60* (2022.01); *B60Q 1/1423* (2013.01); *G06V 10/25* (2022.01); *G06V 20/58* (2022.01); *H05B 47/125* (2020.01)

(58) Field of Classification Search
CPC .......... B60Q 1/085; B60Q 1/1423; B60Q 2300/054; B60Q 1/143; B60Q 2300/42; B60Q 2300/056
See application file for complete search history.

(56) References Cited

U.S. PATENT DOCUMENTS

| | | | | |
|---|---|---|---|---|
| 10,388,685 | B2 * | 8/2019 | Lee | H01L 27/14634 |
| 2016/0034771 | A1 * | 2/2016 | Schamp | G06V 20/56 348/148 |
| 2016/0132745 | A1 * | 5/2016 | Falb | G06T 7/00 348/148 |
| 2017/0236015 | A1 * | 8/2017 | Hattori | G06T 7/70 382/103 |
| 2022/0132022 | A1 * | 4/2022 | Torii | H04N 23/80 |

* cited by examiner

Primary Examiner — Wei (Victor) Y Chan
(74) Attorney, Agent, or Firm — Taylor English Duma, L.L.P.

(57) ABSTRACT

In various examples, contrast values corresponding to pixels of one or more images generated using one or more sensors of a vehicle may be computed to detect and identify objects that trigger glare mitigating operations. Pixel luminance values are determined and used to compute a contrast value based on comparing the pixel luminance values to a reference luminance value that is based on a set of the pixels and the corresponding luminance values. A contrast threshold may be applied to the computed contrast values to identify glare in the image data to trigger glare mitigating operations so that the vehicle may modify the configuration of one or more illumination sources so as to reduce glare experienced by occupants and/or sensors of the vehicle.

20 Claims, 15 Drawing Sheets

GLARE MITIGATION USING IMAGE CONTRAST ANALYSIS FOR AUTONOMOUS SYSTEMS AND APPLICATIONS

BACKGROUND

Autonomous and semi-autonomous driving systems, as well as advanced driver assistance systems (ADAS), may use sensors, such as cameras, to form an understanding of the surrounding environment of the vehicle—in real-time or near real-time. This understanding may include information as to locations of objects, obstacles, road signs, roadway surfaces, and/or other markings. Roadway signs and surfaces are often designed to be easily visible to drivers and other occupants of a vehicle in low-light conditions through use of reflectors, reflective paints, and/or reflective coatings. However, this may cause the roadway signs, indicators, and/or markings to at times produce a high degree of reflected light when illuminated by headlights of a vehicle. In some cases, the reflected light can cause glare in the visual fields of occupants of the vehicle or in the field of view of one or more cameras and/or sensors of the vehicle. This problem may be intensified when the light emitted from the headlights is particularly strong, such as when illuminating very distant objects and/or when the light is reflected from a close distance. Substantial levels of glare can cause visual discomfort to a person and diminish the ability for a vehicle's sensors to capture and analyze sensor data. Attempts to mitigate the effects of glare have involved deactivating high-beam lights of a vehicle based on detecting glare, or in the case of a matrix high beam, excluding a location from the illuminated zone by deactivating light-emitting portions of the matrix high beam that are directed to the location to be excluded.

Conventionally, detecting glare in vehicles has relied on using absolute luminance metering to measure the luminous energy reflected from a surface. Because absolute luminance metering takes a direct measurement of reflected light energy from a particular object, knowledge of the size of the object that is reflecting the light is required. Determining the size of an object for the purpose of absolute luminance metering requires sensing and computational resources to estimate the size (e.g., surface area) of the object beyond what is available in conventional glare detection solutions. For example, the size of an object depicted in a camera image may be determined by translating the position of the object into a three-dimensional (3D) position (e.g., to estimate surface area). This requires additional computational operations due to a wide variety of possible camera orientations, optical distortions, and/or real-time distance measurements. Further, performing a measurement for absolute luminance accurately using this approach requires additional calibration operations and associated hardware to store calibration parameters, such that cameras may require routine calibration against a known luminance target to maintain accurate luminance metering as sensor components wear and/or degrade over time.

SUMMARY

Embodiments of the present disclosure relate to glare mitigation using image contrast analysis for autonomous systems and applications. Systems and methods are disclosed that calculate contrast from sensor data from one or more sensors of a vehicle or other machine or system to detect regions with significant levels of glare so that mitigating operations may be performed.

In contrast to conventional approaches, such as those described above, the present disclosure provides for detecting glare using relative luminance metering. Using disclosed approaches, contrast values may be computed for pixels of images, which may be analyzed to detect glare (e.g., light reflected from signs and other objects). In one or more embodiments, a system may receive image data depicting one or more objects that are illuminated by headlights of a vehicle. Pixels represented in the image data may be used to compute contrast values with respect to other pixels of the image data. In at least one embodiment, one or more local contrast values may be computed for the pixels (e.g., by computing contrast relative to the luminance of all or a portion of the image).

In one or more embodiments, the average luminance value of a set of pixels in an image may be computed to determine a reference luminance. The local contrast values may be determined by computing a ratio of the luminance of a pixel to the calculated reference luminance. A luminance threshold may be applied to the local contrast values associated with a set of pixels to determine a number of pixels that have contrast values that satisfy the luminance threshold. A size threshold may be applied to determine whether glare mitigation operations should be triggered based on the dimensions and/or quantity of pixel that satisfy the luminance threshold.

BRIEF DESCRIPTION OF THE DRAWINGS

The present systems and methods for glare mitigation using image contrast analysis for autonomous systems and applications are described in detail below with reference to the attached drawing figures, wherein.

DETAILED DESCRIPTION

Figure 1:
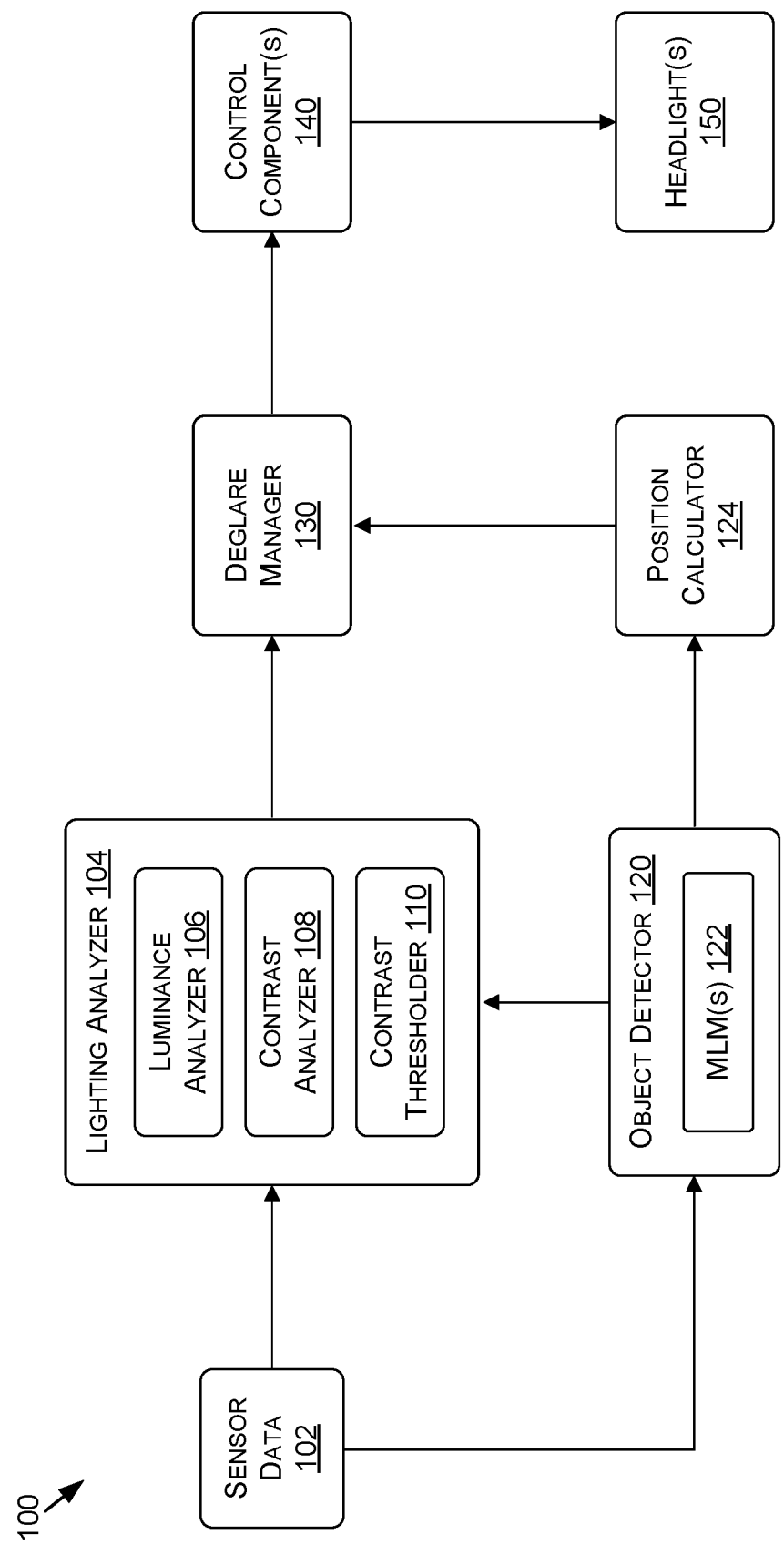
FIG. 1 is an example system diagram of a contrast analysis system for detecting glare using sensor data, in accordance with some embodiments of the present disclosure.

Systems and methods are disclosed related to glare mitigation using image contrast analysis for autonomous systems and applications. Although the present disclosure may be described with respect to an example autonomous vehicle 700 (alternatively referred to herein as "vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater crafts, drones, and/or other vehicle types. In addition, although the present disclosure may be described with respect to glare mitigation for vehicles, this is not intended to be limiting, and the systems and methods described herein may be used in augmented reality, virtual reality, mixed reality, robotics, security and surveillance, autonomous or semi-autonomous machine applications, and/or any other technology spaces where the detection or estimation of glare may be desired, such as for the mitigation or reduction of glare. Disclosed approaches may be implemented in one or more of a control system for an autonomous or semi-autonomous machine, a perception system for an autonomous or semi-autonomous machine, a system for performing simulation operations, a system for performing deep learning operations, a system implemented using an edge device, a system implemented using a robot, a system incorporating one or more virtual machines (VMs), a system implemented at least partially in a data center, or a system implemented at least partially using cloud computing resources.

In contrast to conventional approaches, such as those described above, the present disclosure provides for detecting glare using relative luminance metering. Using disclosed approaches, contrast values may be computed for pixels of images and the contrast values may be further analyzed to detect glare (e.g., light reflected to the driver and/or vehicle sensors). In one or more embodiments, a system may receive image data depicting one or more objects that are illuminated by headlights of a vehicle. Pixels represented in the image data may be used to compute contrast values with respect to other pixels of the image data. In at least one embodiment, one or more global contrast values may be computed for the pixels (e.g., by computing contrast relative to the luminance of all or substantially all of the image). In at least one embodiment, one or more regional contrast values may be computed for the pixels (e.g., by computing contrast relative to the luminance of one or more regions of the image that include one or more of the pixels). In at least one embodiment, one or more local contrast values may be computed for the pixels (e.g., by computing contrast relative to the luminance of one or more regions of the image based on proximity or distance to the pixels). By using relative luminance, glare may be detected without performing sensor calibration or having to determine the physical dimensions of an object in 3D space, since only the relative contrast is computed.

In some examples, the system may receive image data generated using one or more cameras that may be placed at various positions relative to a vehicle (e.g., front center, dashboard, etc.). Where multiple cameras are used, each camera may share a similar or different field of view (e.g., wide angle, telephoto, etc.). In various examples, the image data may represent one or more images of the same resolution that is captured by a camera(s), and/or may be downsampled or upsampled to a different resolution(s). In at least one embodiment, the image data may include RAW, RAW-like, and/or other sensor data where the image pixel signal is in a linear representation (e.g., preserving the original pixel levels read from the imaging sensor) and is proportional to the luminous intensity of light. The image data may be generated using one or more camera lenses that do not introduce a significant vignetting or "lens shading" (darkening in corners) phenomenon, or pixels exhibiting vignetting may be corrected (e.g., in the image signal processor (ISP) using lens shading correction on the RAW).

In at least one embodiment, contrast values for the pixels may be computed from the image data based at least on comparing pixel luminance to the luminance of one or more other pixels. For example, one or more statistical values may be computed from luminance values of any quantity of pixels of the image to establish a reference or relative luminance used to compute one or more contrast values. By way of example, and not limitation, this may include computing a mean (average) image luminance level. Suitable techniques for computing the reference luminance include computing a histogram or mean of pixel contrast values, performing global pixel averaging, and/or computing the trimmed mean value (e.g., where lower and upper percentiles are dropped from consideration, producing mean values that are more stable in high contrast scenes).

Pixels used to compute the reference luminance for global contrast values may correspond to all or substantially all of the image. In at least one embodiment, one or more pixels may be discarded or excluded from computing the reference luminance, such as outliers, pixels corresponding to image or visual artifacts, pixels outside of a region of interest (e.g., that will not be applied to a CNN or other MLM), etc. Pixels used to compute the reference luminance for regional contrast values may correspond to one or more regions of the image that include one or more of the pixels (and/or at least a portion of an object corresponding to the pixels). For example, a region may include 50% or a different percentage of pixels in an image, pixels in a center region of an image, pixels in a quadrant of an image, etc.). In at least one embodiment, a reference luminance for a region may be used to compute a contrast value for a pixel based at least on the pixel being included in the region (with the region being defined without regard to the location of the region). Pixels used to compute the reference luminance for local contrast values may be selected or determined based at least on a proximity and/or or distance to one or more of the pixels (and/or at least a portion of an object corresponding to the pixels).

In at least one embodiment, the system may produce an image, where each pixel(s) records a corresponding contrast value(s). The contrast value for a pixel may be computed based at least on a ratio between the luminance of the pixel value and the reference luminance (e.g., a mean). Depending on the size (e.g., radius) of an area selected to compute a reference luminance, a computed contrast value may represent different phenomena. A small radius (e.g., <0.1% of an image dimension) may represent the sharpness of image, a small to medium radius (e.g., <3-4% of an image dimension) may represent the contrast of object details, a medium radius may represent the contrast of objects, and a large radius that encompasses or substantially encompasses the entire image may represent the global contrast.

In at least one embodiment, an object detector, such as a convolutional neural network (CNN) and/or other machine learning model (MLM) may be used to detect one or more objects (e.g., road signs, reflectors, road markings, etc.) in the image data. For example, the MLM(s) may predict one or more object locations and/or regions in one or more images represented by the image data (e.g., one or more bounding shapes). The detected objects may be associated with one or more pixels of the image data using the one or more object locations and/or regions (e.g., an object may be associated with one or more pixels within a bounding shape). The system may compute contrast values for one or more of the pixels of the input image based at least on one or more of the detected locations and/or bounding shapes. For example, a location(s) or bounding shapes may be used to compute local, global, and/or regional contrast values for one or more corresponding pixels.

Additionally or alternatively, one or more objects and/or regions of the image may be detected or selected using other approaches, which may not necessarily include machine learning. For example, pixels in the image may be grouped using any suitable clustering algorithm, which may cluster pixels into one or more groups based at least on image features, such as luminance, color values, contrast values (e.g., by first determining global contrast values for grouping, then determining local contrast values using the groups), relative brightness, relative hue, relative tint, etc. In one or more embodiments, a contrast value may be computed for a group (e.g., applied to all pixels in the group) and/or for one or more pixels in the group (e.g., each pixel).

After computing contrast values, the system may analyze the contrast values to detect glare and/or other lighting phenomena. In at least one embodiment, analyzing the contrast values may include comparing the contrast values to one or more threshold values. A threshold value may be predetermined and/or dynamically determined or computed. By way of example and not limitation, the threshold value for a contrast value may be computed or selected based at least on one or more reference luminance values used to compute the contrast value. In at least one embodiment, the threshold value may be a multiple of the reference luminance, for example and without limitation 5×, 10×, or 100× the reference luminance. In at least one embodiment, the threshold(s) may be applied to the contrast image to generate a thresholded contrast image. In at least one embodiment, the thresholded contrast image may be generated directly based at least on applying the one or more thresholds to contrast values as they are computed (without an initial contrast image). For example, any pixel with a contrast value above the threshold value (e.g., high contrast pixels) may be preserved or set to a particular value (e.g., 1), while pixels with a contrast value below the threshold value (e.g., low contrast pixels) may be removed or set to a particular value (e.g., 0).

In one or more embodiments, based on a quantity of pixels corresponding to a group of pixels (e.g., associated with a detected object) having contrast values satisfying a threshold value, the system may transmit data to cause the vehicle to alter an intensity (e.g., increase brightness, decrease brightness, deactivate, etc.) or configuration (e.g., position, direction, lens focal length, etc.) of one or more headlights and/or other lights of the vehicle. For example, the intensity may be modified or changed based at least on one or more locations of the group of pixels in the image and/or a correspond location(s) in the real-world.

In at least one embodiment, the quantity of pixels above a threshold value may be counted or compared to the number of pixels in a particular region. For example, the quantity of pixels in a bounding box or shape corresponding to an object that have a contrast value above a threshold value may be compared to the quantity of pixels in the bounding box or shape to determine a ratio of high contrast pixels to low contrast pixels.

In at least one embodiment, the system may apply a size threshold to the quantity of pixels that have a corresponding contrast value that satisfy a threshold value. For example, a size threshold may indicate a minimal number of pixels necessary to trigger a glare mitigation or other lighting operation. In some examples, the size threshold may be applied based on the number of pixels, the dimension of a region occupied by the pixels (e.g., the bounding box or a sub-region occupied by the pixels satisfying the threshold), one or more dimensions of the one or more images, and/or any suitable method for determining a size associated with pixels. For example, the ratio of pixels having a contrast value above a threshold value within a bounding box may be compared to one or more of the dimensions of the bounding box.

As described herein, the system may transmit data that causes a vehicle or machine to perform operations attempting to mitigate glare. For example, based on the pixel contrast values, data may be transmitted that causes a vehicle to modify or change one or more illumination sources (e.g., headlights, fog lights, etc.) to mitigate the detected glare. In some examples, mitigating glare may involve modifying the configuration of one or more elements of a headlight. For example, based on detecting glare, a matrix beam headlight-having a plurality of independently configurable lighting elements that illuminate a portion of a vehicle's environment—may deactivate and/or reduce the intensity of one or more lighting elements that are associated with a physical location corresponding to the high contrast pixels of the image data.

With reference to FIG. 1, FIG. 1 is an example system diagram of a contrast analysis system 100 (also referred to as "system 100"), for detecting glare using sensor data, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

The contrast analysis system 100 may include, among other things, sensor data 102, a lighting analyzer 104, an object detector 120, a deglare manager 130, a position calculator 124, one or more control component(s) 140, and one or more headlight(s) 150 (or more generally lighting elements). The contrast analysis system 100 may perform operations for generating and/or receiving the sensor data 102 from one or more sensors. The sensor data 102 may be received, as a non-limiting example, from one or more sensors of a vehicle (e.g., vehicle 700 of FIGS. 7A-7D and described herein). The sensor data 102 may include, without limitation, one or more portions of sensor data from any combination of the sensors of the vehicle 700 including, for example and with reference to FIGS. 7A-7D, global navigation satellite systems (GNSS) sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), and/or other sensor types.

Additionally or alternatively, the sensor data 102 may include virtual (e.g., simulated or augmented) sensor data generated from any number of sensors of a virtual vehicle or other virtual object in a virtual (e.g., testing) environment. In such an examples, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 122 described herein may be tested, trained, and/or validated using simulated data from a simulated environment and/or augmented real-world data, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LiDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), Red Green Blue (RGGB), or other type of imaging sensor, and/or other formats. In addition, in some examples, the sensor data 102 may be used within the system 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

With reference to the lighting analyzer 104, the lighting analyzer 104 may include, among other things, one or more components for measuring and/or calculating contrast represented by image data. For example, the lighting analyzer 104 may be used to provide contrast values for image data such as the sensor data 102. In some embodiments, the lighting analyzer 104 may include a luminance analyzer 106, a contrast analyzer 108, and/or a contrast thresholder 110. Although only a few components and/or features of lighting analyzer 104 are illustrated in FIG. 1, this is not intended to be limiting. For example, the lighting analyzer 104 may comprise additional or alternative components, such as those described below with respect to the example autonomous vehicle 700 of FIGS. 7A-7D.

The luminance analyzer 106 may include one or more components for performing measurement and/or extraction of luminance values from one or more pixels of image data. For example, luminance values may be determined for one or more pixels included in image data representative of the sensor data 102. In at least one embodiment, the luminance analyzer 106 may determine a luminance value for each pixel of an image. For example, an image represented by the sensor data 102 may have a luminance value associated with every pixel in that particular image. In at least one embodiment, a quantity of pixels less than every pixel in an image may be selected and corresponding luminance values may be determined by the luminance analyzer 106. For example, luminance values may be determined in accordance to a portion of the sensor data 102 indicated by the object detector 120 and/or the MLM(s) 122. For instance, the object detector 120 may provide information (e.g., object location, object position, classification, label, characteristics, and/or other relevant information about the detected object) associated with a detected object to the lighting analyzer 104 which may use the provided information to determine a selection of pixels (e.g., pixels representing an object, pixels in proximity to an object, etc.) for which luminance and/or contrast values are determined.

The contrast analyzer 108 may use the pixel luminance values determined by the luminance analyzer 106 to calculate contrast values corresponding to pixels of the image (e.g., global, regional, and/or local). For example, the contrast analyzer 108 may evaluate the luminance value of a particular pixel against the average luminance value (or other statistical value described herein) of a set of pixels, such as the average luminance value of every pixel in an image. In some embodiments, the contrast analyzer 108 may compute an average luminance value for a set of pixels as a reference luminance. Although an average of the pixel luminance values is described herein, it is not intended to be limiting, and any suitable techniques for computing the reference luminance including computing a histogram mean, performing global pixel averaging, and/or computing the trimmed mean value, is contemplated herein. For example, the contrast analyzer 108 may determine a reference luminance by computing a histogram or mean of the luminance values for a set of pixels corresponding to a detected object and a region within a particular proximity and/or radius of distance to the detected object. The reference luminance may be used to compute a contrast value for one or more pixels in the image. The contrast analyzer 108 may calculate contrast value for a pixel that is expressed as a ratio—or other relation-between the luminance value of a particular pixel and the reference luminance.

The contrast thresholder 110 may include one or more components for applying a contrast threshold to determine a set of pixels that have corresponding contrast values which satisfy the contrast threshold. In at least one embodiment, the contrast threshold is predetermined. For example, the contrast threshold may be determined to be a value (e.g., 5×, 10×, 100×, etc. relative to the reference luminance) at which glare may become uncomfortable to an observer and/or a value at which any glare may disrupt the ability of sensors to capture sensor data. The contrast threshold value may be pre-determined or dynamically determined based on the pixel luminance values determined by the luminance analyzer 106. The contrast thresholder 110 may receive the contrast values associated with a set of pixels from the contrast analyzer 108. For example, the contrast thresholder 110 may count or determine the number of pixels that have a relative contrast value above the threshold value.

Referring now to the object detector 120, the object detector 120 may include, among other things, one or more components for detecting one or more objects (e.g., road signs, reflectors, road markings, etc.) in the image data. In some embodiments, the object detector 120 may use a convolutional neural network (CNN) and/or other machine learning model (MLM) to detect one or more objects (e.g., road signs, reflectors, road markings, etc.) in the image data. For example, the object detector 120 may use one or more MHLM(s) 122 to detect objects in the sensor data 102 (e.g., in an image). In at least one embodiment, the object detector 120 may detect one or more objects using approaches that do not necessarily rely on the MLM(s) 122. For example, the object detector 120 may detect objects by clustering and analyzing features, such as luminance, color values, contrast values, relative brightness, relative hue, relative tint, etc. corresponding to the pixels of an image represented by the sensor data 102.

Where the MLM(s) 122 may is used to detect one or more objects in an image the sensor data 102 and/or data derived therefrom may be applied to the MLM 122 to predict one or more object locations and/or regions in one or more images represented by the sensor data 102 as containing an object. The detected object(s) may be associated with one or more pixels of the image data using the one or more object locations and/or regions (e.g., an object may be associated with one or more pixels within a bounding shape or box). The contrast analyzer 108 may compute contrast values for one or more of the pixels of the input image based at least on one or more of the detected locations and/or bounding shapes. For example, a location(s) or bounding shape(s) may be used to compute local, global, and/or regional contrast values for one or more corresponding pixels.

Referring now to the position calculator 124, the position calculator may include one or more components configured to determine one or more 2D and/or 3D locations of detected objects. For example, the position calculator 124 may receive indications of one or more objects detected by the object detector 120 and may determine the position of, and/or distance to, the one or more detected objects. In one or more embodiments, this may include post-processing prediction data from an MLM 122. In some embodiments, the position calculator 124 may determine the position of one or more detected objects relative to an autonomous machine such as autonomous vehicle 700 of FIGS. 7A-7D.

For example, the position calculator 124 may calculate the distance from a vehicle to a detected object, such as a sign, and generate information (e.g., distance, angle relative to vehicle direction of travel, height of object, size of object, etc.) associated with the calculated position of the sign relative to the vehicle. In some embodiments, the position calculator 124 may provide position information associated with one or more detected objects to the deglare manager 130.

The deglare manager 130 may include one or more components for determining glare mitigation operations to perform based at least on the relative contrast values corresponding to the pixels of the image(s) corresponding to the sensor data 102. For example, based on the contrast values calculated by the lighting analyzer 104, the deglare manager 130 may determine one or more objects represented in the sensor data 102 as candidates for glare mitigating operations and thus trigger the glare mitigating operations. In some embodiments, the deglare manager 130 may determine objects represented in the sensor data 102 as candidates for glare mitigating operations based on applying a size threshold to the pixels associated with the objects. For example, the deglare manager 130 may determine that glare mitigating operations should be performed in association to a detected object based on the size of the object and/or the number of pixels that exceed a contrast threshold (e.g., as indicated by the contrast thresholder 110). For instance, in one or more embodiments a glare mitigating operations may only be performed when the number of high contrast pixels associated with an object satisfies a minimum quantity. In some examples, if the size threshold is not satisfied, no glare mitigating operations will be triggered even if all pixels associated with a detected object have contrast values above the contrast threshold.

In at least one embodiment, the deglare manager 130 may receive positional information associated with one or more detected objects. In at least one embodiment, positional information from the position calculator 124 may be used to determine whether a detected object satisfies the size threshold. For example, the size of an object may be estimated using the distance to the object determined by the position calculator 124 and based on the sensor data 102. In at least one embodiment, the deglare manager 130 may receive information corresponding to a calculated 3D position of a detected object from the position calculator 124. The deglare manager 130 may use the positional information from the position calculator 124 to determine glare mitigation operations to perform. For example, if the positional information from the position calculator 124 indicates a likelihood-based on the positions of a detected object, occupants of a vehicle, sensors of the vehicle, and/or one or more headlight(s) 150—that the light emitted by the headlight(s) 150 may reflect off of the reflected object in the direction of the occupants or sensors of the vehicle, then glare mitigating operations (e.g., reducing illumination power to one or more elements of the headlights) may be triggered. As an example, the deglare manager 130 may estimate one or more distances and/or angles between a detected sign and the headlight(s) 150 and/or the position of particular portions of a vehicle such as the location of sensors or potential driver/occupants.

In some embodiments, based on the deglare manager 130 determining that glare mitigating operations should be performed in association to a detected object, the deglare manager 130 may provide information associated with the detected object to the one or more control component(s) 140 that may cause modification (e.g., control a change) to one or more headlight(s) 150. For example, the deglare manager 130 may provide an indication of the position of a glare inducing object to the one or more control component(s) 140 to cause an adjustment to at least one lighting element of the headlight(s) 150.

The headlight(s) 150 may include one or more illumination sources associated with an autonomous machine such as autonomous vehicle 700 of FIGS. 7A-7D. Although front-facing headlights are described herein, this is not intended to be limiting, and any other light source or orientation of light source is contemplated herein. For example, the headlight(s) 150 may include low-beam headlights, high-beam headlights, fog lights, running lights, hazard lights, signal lights, and/or any other illumination sources (e.g., those capable of reflecting light back towards a passenger and/or sensor of the vehicle 700 or otherwise causing or contributing to glare). In some embodiments, the headlight(s) 150 may emit light having a wavelength outside of the visible-light spectrum (e.g., visible to human eye). For example, headlight(s) 150 may emit non-visible radiation or non-visible light (e.g., to the human eye) such as infrared light (IR). The headlight(s) 150 may include one or more independently configurable lighting elements. For example, the headlight(s) 150 may include a plurality of lighting elements arranged in a matrix arrangement (e.g., grid). In such an example, each lighting element may be configured individually or in association with one or more other elements. For instance, an individual lighting element may be configured by activating/deactivating the emitted light, increasing or decreasing the illumination power of the element, adjusting the direction or focus of the projected light, or any combination of configurations. By modifying the configuration of one or more lighting elements of the headlight(s) 150, glare reflected by objects may be mitigated. For example, if glare is detected from a sign, lighting elements that are illuminating the sign may be deactivated or projected away from the sign (e.g., while maintaining illumination around the sign or other object).

Figure 2A:
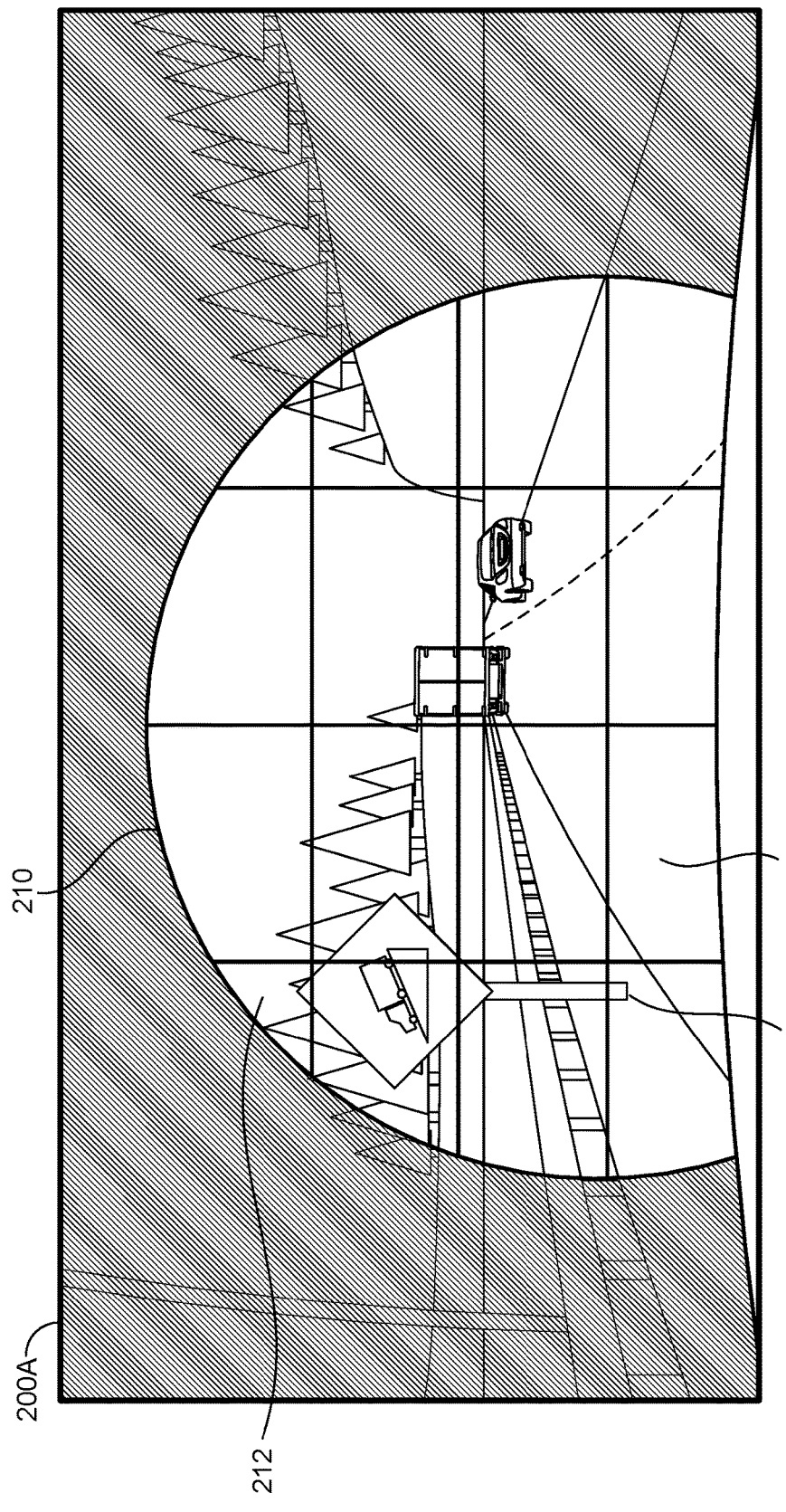
FIG. 2A illustrates an example image from a perspective of a vehicle, in accordance with some embodiments of the present disclosure.
Figure 2A:
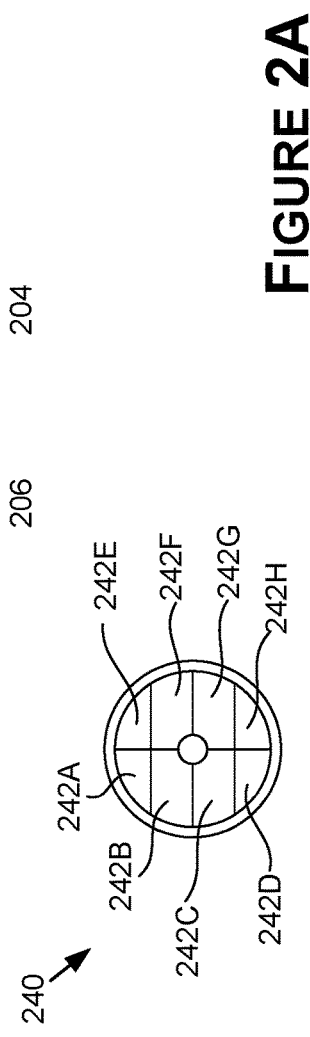
Figure 2B:
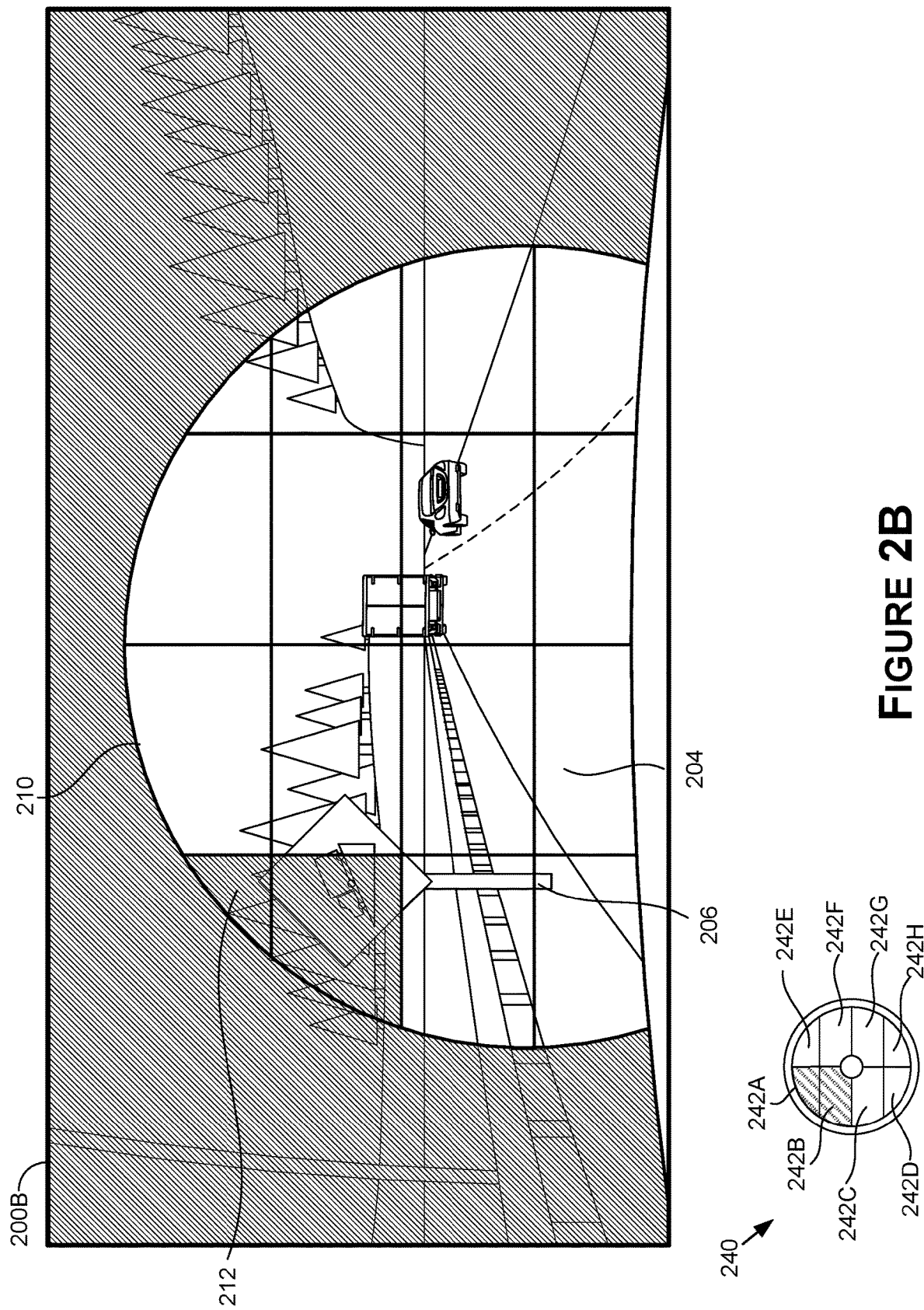
FIG. 2B illustrates an example image from a perspective of a vehicle after glare mitigation, in accordance with some embodiments of the present disclosure.

As non-limiting examples, and with respect to FIGS. 2A-2B, FIGS. 2A-2B are used to illustrate examples glare mitigation, in accordance with at least some embodiments of the present disclosure. For example, FIG. 2A illustrates an example image 200A from the perspective of a vehicle such as the vehicle 700 (e.g., a perspective of a camera thereof) and FIG. 2B illustrates an example image 200B from a perspective of the vehicle 700 after glare mitigation, in accordance with some embodiments of the present disclosure.

As an example, the vehicle 700 may be on a roadway 204 which includes objects such as road surface markings, vehicles, pedestrians, obstacles, visual indicators, and/or signage such as a road sign 206. The roadway 204 may be wholly or partially illuminated by one or more illumination sources such as a headlight 240 which may correspond to one or more of the headlights 150 of FIG. 1. The illumination sources may be partitioned and/or grouped into lighting elements which may be individually and/or collectively controlled. For example, the headlight 240 may include any of a number of lighting elements, such as light elements 242A-242H. Although, the headlight 240 is depicted with 8 elements, this is not intended to be limiting and any number and/or positional arrangement of lighting elements is contemplated herein.

The illumination sources may cause an illumination footprint 210 to be cast or projected in association with the roadway 204 such that the roadway 204 may be at least partially illuminated. Portions of the illumination footprint 210 may correspond to at least one light element of an illumination source. For example, each beam segment of beam segments 212, may correspond to a light element such as light elements 242A-242H. In some examples, reducing power and/or deactivating a particular light element may cause the associated beam segments to have reduced illuminating effect on the roadway 204. For instance, as illustrated in FIG. 2B and reflected by the image 200B, the light elements 242A and 242B have been deactivated causing a portion of the beam segments 212 to cease illuminating the road sign 206. In this example, since the light elements 242A and 242B that are associated with the portion of the beam segments 212 corresponding to the road sign 206 have been deactivated, glare caused by the headlight 240 cast upon the road sign 206 may be reduced or eliminated for the sensors and/or occupants of vehicle 700.

Figure 3:
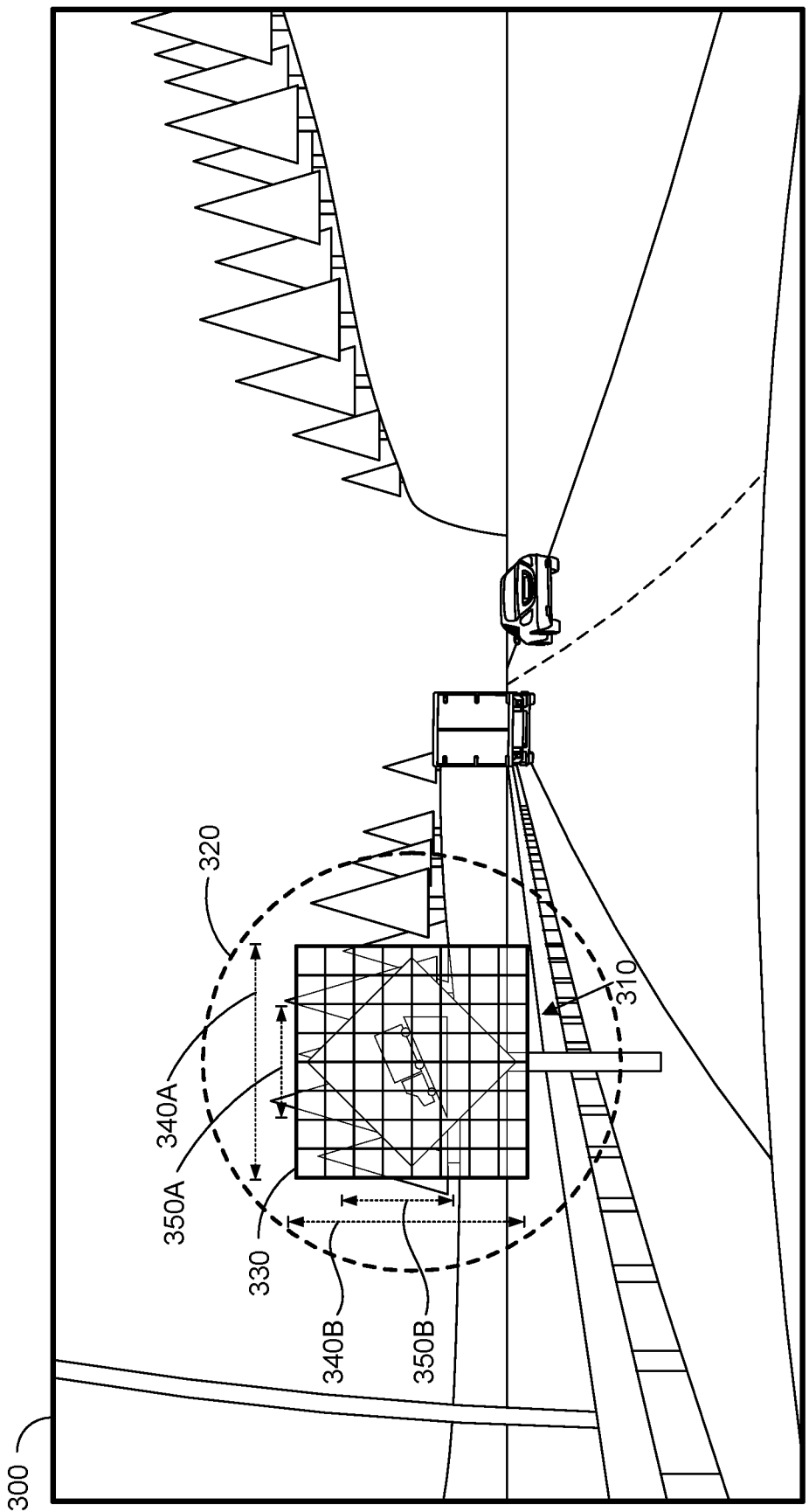
FIG. 3 is a visualization of an example image for use in determining local contrast values for pixels associated with detected objects, in accordance with some embodiments of the present disclosure.

Now referring to FIG. 3, FIG. 3 illustrates a visualization of example image 300 for use in determining local contrast values for pixels associated with detected objects, in accordance with some embodiments of the present disclosure. The image 300 includes a detected object 310 (e.g., a sign) that may be detected using the object detector 120 of FIG. 1. As described herein, the object detector 120 may indicate one or more of the dimensions and/or position of a bounding shape associated with the detected object 310, such as a bounding box 330. The bounding box 330 may define a region of the image 300 including one or more pixels associated with the image 300. The image 300 may also include a local contrast region 320 that may be located or defined in association with the bounding box 330. The local contrast region 320 may include one or more pixels of the image 300 that may be used to calculate a reference luminance used to determine a local contrast value—as described herein—for one or more pixels (e.g., each pixel) within the bounding box 330.

One or more of the dimensions of the bounding box 330 may be compared to a size threshold(s) to determine whether to trigger a glare mitigation or other lighting operation. For example, the deglare manager 130 of FIG. 1, may apply a size threshold to the dimensions of the bounding box 330. A size threshold (e.g., indicating a minimum size or dimension) may be applied to horizontal and/or vertical components of the bounding box 330. For example, a horizontal size threshold 350A may be applied to a horizontal object size 340A and/or a vertical size threshold 350B may be applied to a vertical object size 340B. In some embodiments, a glare mitigation operation may be triggered if the horizontal object size 340A exceeds the horizontal size threshold 350A and if the vertical object size 340B exceeds the vertical size threshold 350B. In some embodiments, the glare mitigation operation may be triggered if either the horizontal object size 340A exceeds the horizontal size threshold 350A or the vertical object size 340B exceeds the vertical size threshold 350B. In some embodiments, the vertical object size 340B and the horizontal object size 340A may be used to determine an object area that can be compared to a threshold area (e.g., minimum area necessary to trigger glare mitigation operations). For example the vertical object size 340B and the horizontal object size 340A may be multiplied to determine an object area that may be compared to an area calculated by multiplying the vertical size threshold 350B and the horizontal size threshold 350A.

Figure 4A:
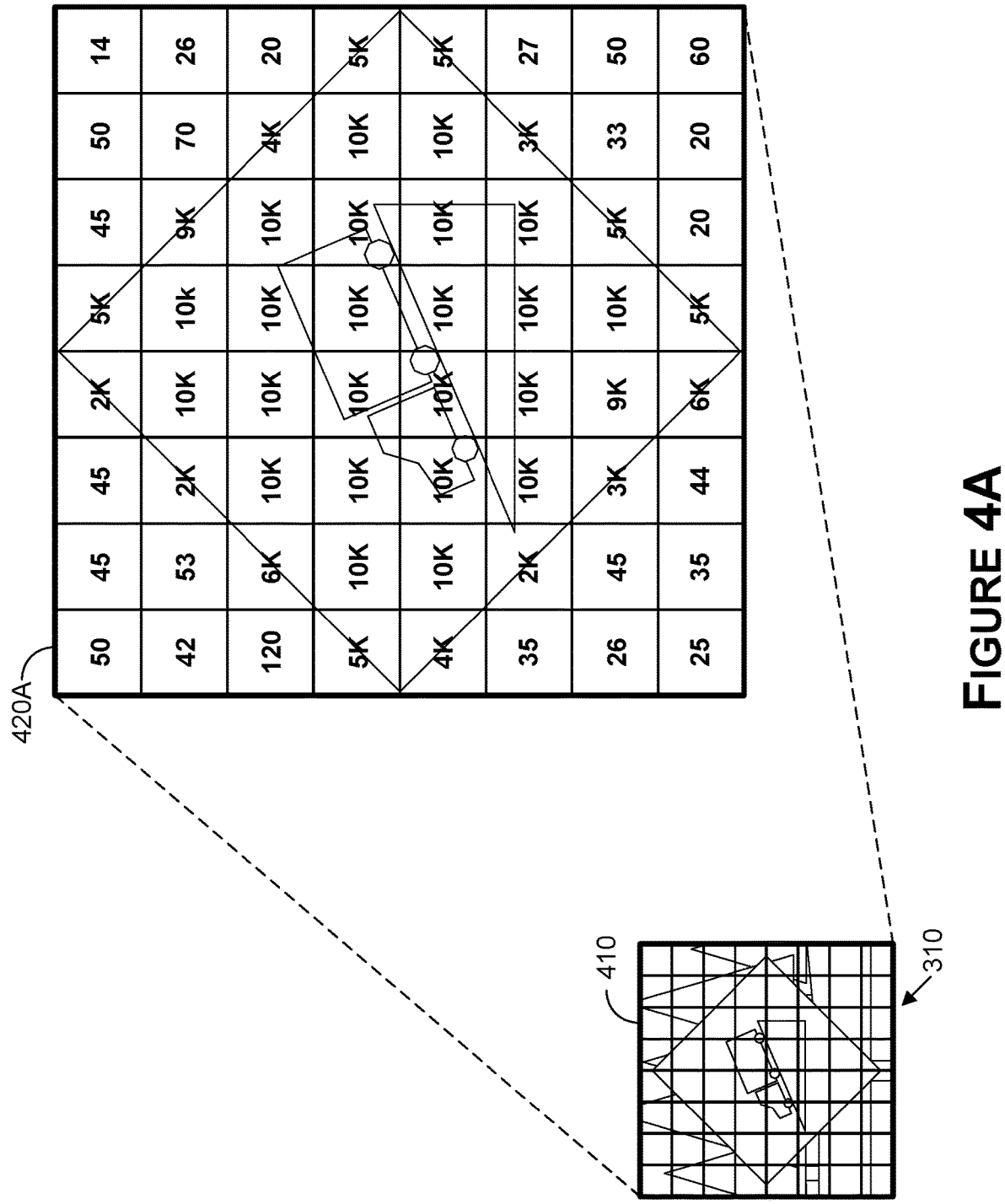
FIG. 4A-4C are examples of applying a contrast analyzer to pixels corresponding to a detected object, in accordance with some embodiments of the present disclosure.
Figure 4B:
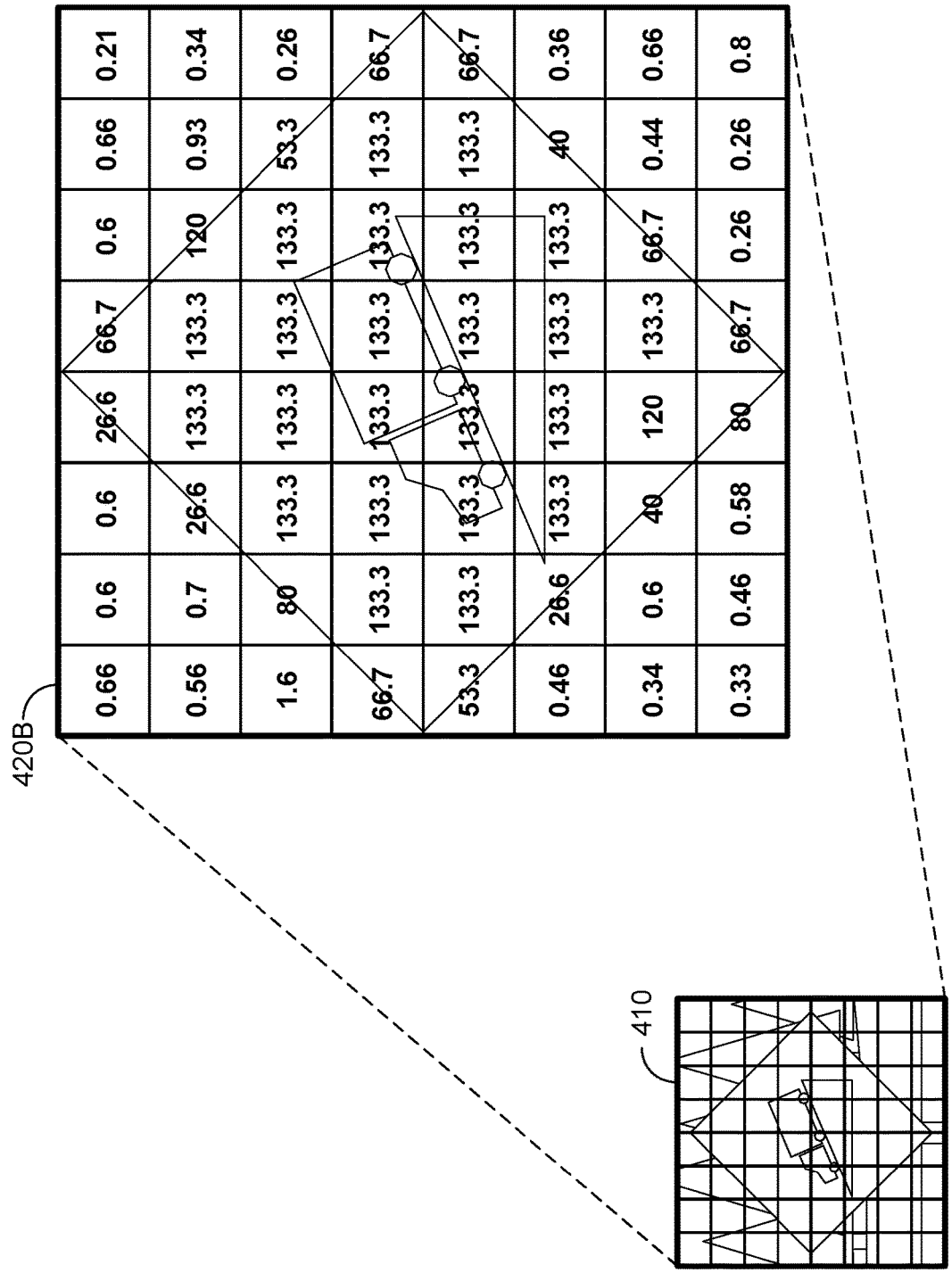
Figure 4C:
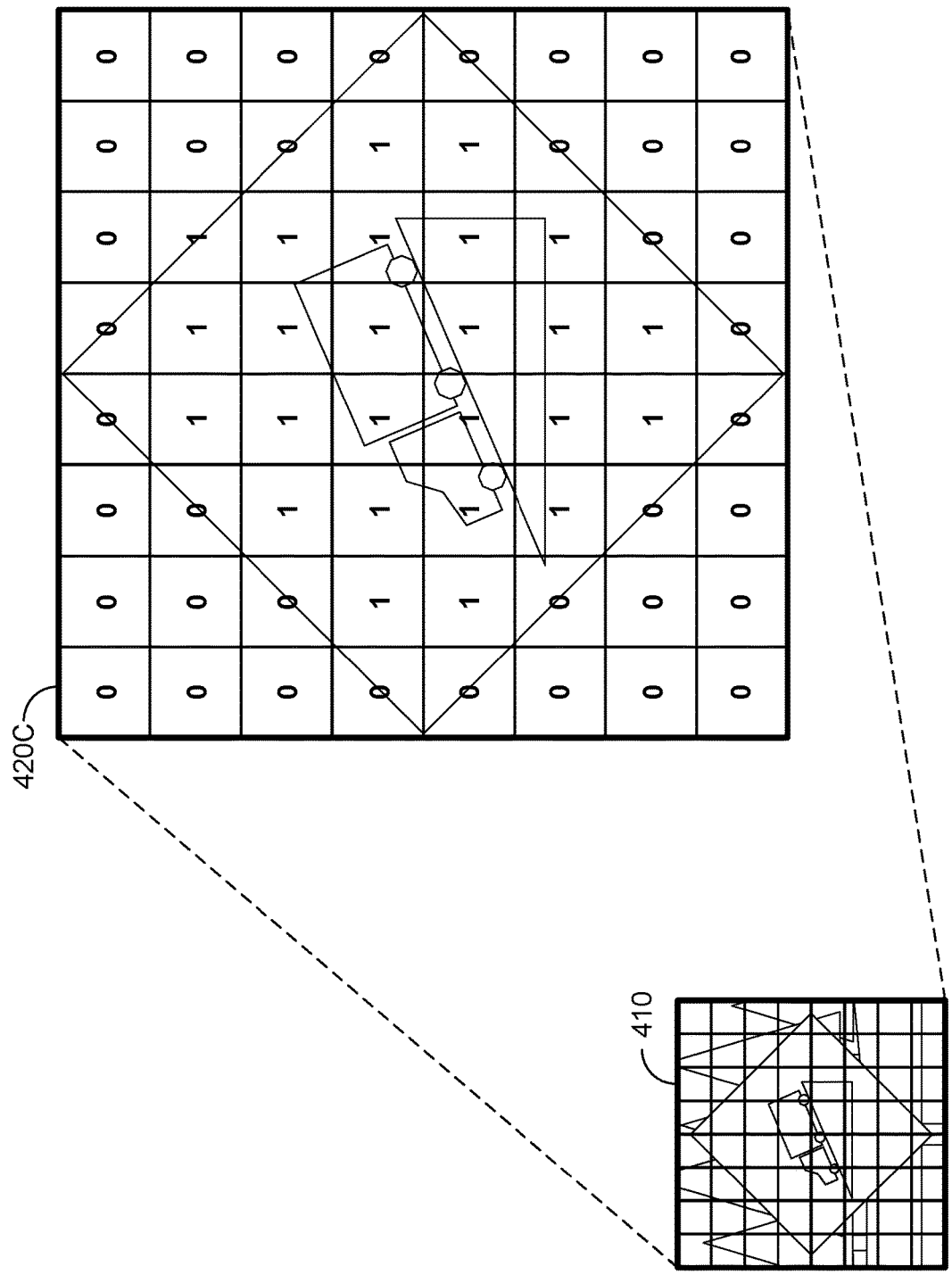

Referring now to FIGS. 4A-4C, FIGS. 4A-4C illustrates examples of applying the lighting analyzer 104 of FIG. 1 to pixels corresponding to the detected object 310, in accordance with at least some embodiments of the present disclosure. FIG. 4A illustrates a region 410 of the image 200A of FIG. 2A that may correspond to the sensor data 102 of FIG. 1. For example the region 410 may include a portion of the pixels represented by the sensor data 102. In some embodiments the region 410 includes one or more pixels associated with the object 310 detected in the sensor data 102. For example, the object detector 120 may provide the dimensions, locations, and/or other indications of pixels associated with a detected object. For instance, the object detector 120 may generate a bounding shape corresponding to a detected object (e.g., road sign, vehicle, pedestrian, etc.) and determine a set of pixels within the bounding shape. The set of pixels may be provided to the lighting analyzer 104. Using the luminance analyzer 106, a determination of a luminance value may be determined (e.g., for each pixel individually). For example, the region 410 in FIG. 4A may correspond to the bounding box 330 of a detected sign that includes a set of pixels that each have a corresponding luminance value, as indicated by the luminance values 420A (e.g., 10K candela per square meter "$cd/m^2$"). Using the luminance values 420A of the region 410, the contrast analyzer 108 may compute each contrast value by comparing the corresponding luminance value to the reference luminance.

FIG. 4B illustrates an example of contrast values 420B which may be computed using the luminance values 420A. In at least one embodiment, a contrast value of the contrast values 420B for a particular pixel may be determined by calculating the ratio between the luminance value of that particular pixel and a reference luminance (e.g., a mean) of a determined group of pixels, as described herein. For example, determining the reference luminance may be based on selecting an area of the image 200A. The area of the image 200A may be selected to capture details of the relative contrast associated with one or more objects within the image 200A. For example, radii of various sizes (e.g., a small radius, a small to medium radius, a medium radius, a large radius, etc.) may be used to determine the group of pixels that are used to determine the reference luminance by averaging and/or calculating a central tendency. For example, the local contrast region 320 of FIG. 3 may be used to determine a reference luminance from the pixels within the corresponding region. As depicted in FIG. 4B, a contrast value may be determined for each pixel of the region 410. For instance, in the example illustrated by FIG. 4B, each pixel of the set of pixels is associated with a contrast value calculated by determining the ratio of the corresponding luminance values 420A to the reference luminance of 75 $cd/m^2$ in this non-limiting example.

FIG. 4C illustrates an example of thresholded values 420V which may result from applying a threshold operation to the contrast values 420C. A thresholding operation may be performed by the contrast thresholder 110 of FIG. 1. In the non-limiting example illustrated by FIG. 4C, a threshold of 100 is applied to each contrast values of the contrast values 420C. In one or more embodiments, only the pixels of the region 410 which have contrast values satisfying the threshold of 100 will be preserved or otherwise identified as satisfying the contrast threshold. As an example, pixels with contrast values 420C that satisfy the threshold may be assigned a value of 1, while the pixels with contrast values 420C that do not satisfy the threshold may be assigned a value of 0, or otherwise negated or indicated. The quantity of pixels in the region 410 that satisfy the threshold may be determined and may be used in glare mitigation operations, such as by the deglare manager 130, the control component(s) 140, and/or the headlight(s) 150 of FIG. 1.

Figure 5:
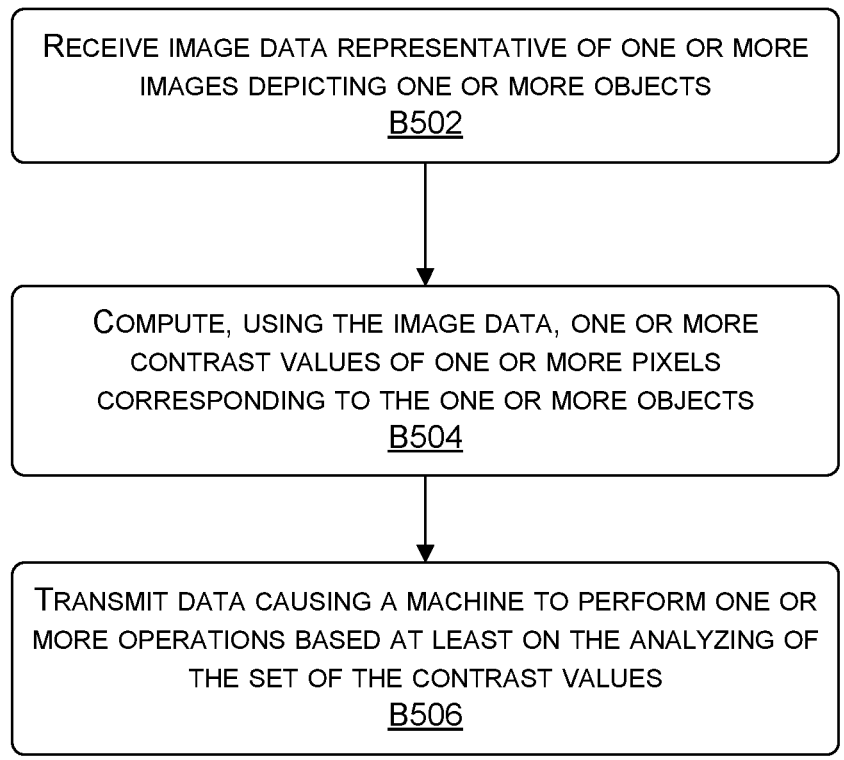
FIG. 5 is a flow diagram illustrating an example method for image contrast analysis for glare mitigation, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the contrast analysis system of FIG. 1. However, these methods may additionally or alternatively be executed by any one system, or any combination of systems, including, but not limited to, those described herein.

FIG. 5 is a flow diagram showing a method 500 for image contrast analysis for glare mitigation, in accordance with some embodiments of the present disclosure. The method 500, at block B502, includes receiving image data representative of one or more images depicting one or more objects. For example the sensor data 102 may be received by the lighting analyzer 104 and the object detector 120.

The method 500, at block B504, includes computing, using the image data, one or more contrast values of one or more pixels corresponding to the one or more objects. For example, the contrast analyzer 108 may determine contrast values for pixels represented using the sensor data 102 and corresponding to one or more objects that may be detected by the object detector 120.

The method 500, at block B506, includes transmitting data to cause a machine to perform one or more operations based at least on the analyzing of the set of the contrast values. For example, based on contrast values determined by the lighting analyzer 104, one or more control component(s) 140 may perform operations, such as adjusting, modifying, or controlling the headlight(s) 150.

Figure 6:
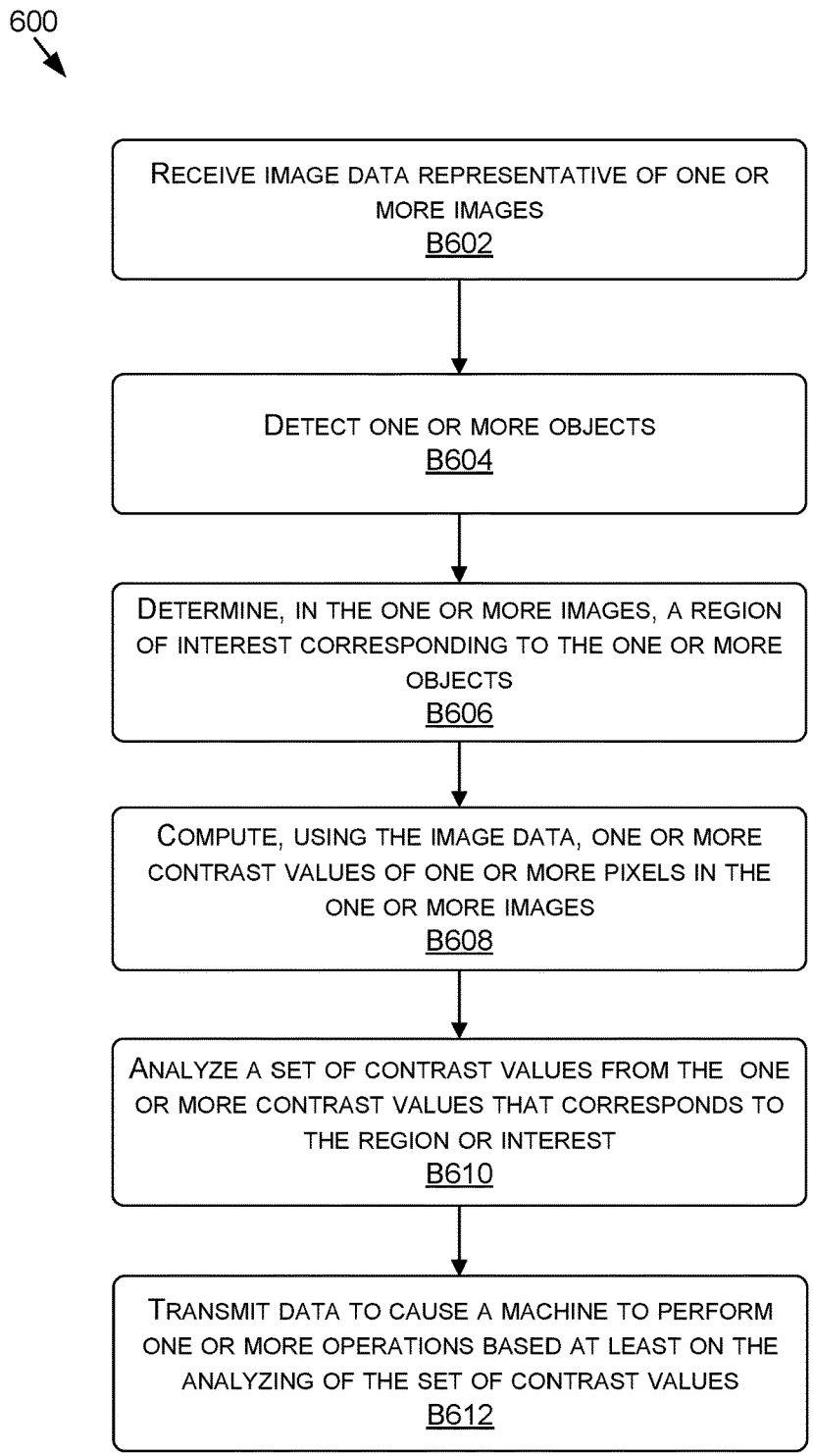
FIG. 6 is a flow diagram illustrating an example method for image contrast analysis for glare mitigation based on object detection, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the contrast analysis system of FIG. 1. However, these methods may additionally or alternatively be executed by any one system, or any combination of systems, including, but not limited to, those described herein.

FIG. 6 is a flow diagram showing a method 600 for image contrast analysis for glare mitigation based on object detection, in accordance with some embodiments of the present disclosure. The method 600, at block B602, includes receiving image data representative of one or more images. For example, the lighting analyzer 104 may receive the sensor data 102.

The method 600, at block B604, includes detecting one or more objects. For example, using the sensor data 102, the object detector 120 may detect one or more objects represented in the sensor data 102.

The method 600, at block B606, includes determining, in the one or more images, a region of interest corresponding to the one or more objects. For example, the object detector 120 may determine a region of interest indicating pixels which correspond to one or more objects detected in the sensor data 102.

The method 600, at block B608, includes computing, using the image data, one or more contrast values of one or more pixels in the one or more images. For example, the contrast analyzer 108 of the lighting analyzer 104 may determine contrast values for pixels represented by the sensor data 102. In one or more embodiments, the computation of contrast values may be limited to or otherwise based at least on the regions of interest or areas of detected objects of interest (e.g., signs). For example, computing local contrast values may be compute-heavy (as every pixel may depend on all surrounding pixels) and limiting the pixels that are analyzed can save computational resources.

The method 600, at block B610, includes analyzing a set of contrast values from the one or more contrast values that correspond to the region of interest. For example, the contrast thresholder 110 may analyze one or more contrast values for one or more pixels corresponding to the region of interest determined by the object detector 120.

The method 600, at block B612, includes transmitting data to cause a machine to perform one or more operations based at least on the analyzing of the set of contrast values. For example, based on the analyzed contrast values from the lighting analyzer 104, the control component(s) 140 may perform operations such as controlling the configuration of one or more elements of the headlight(s) 150.

Example Autonomous Vehicle

Figure 7A:
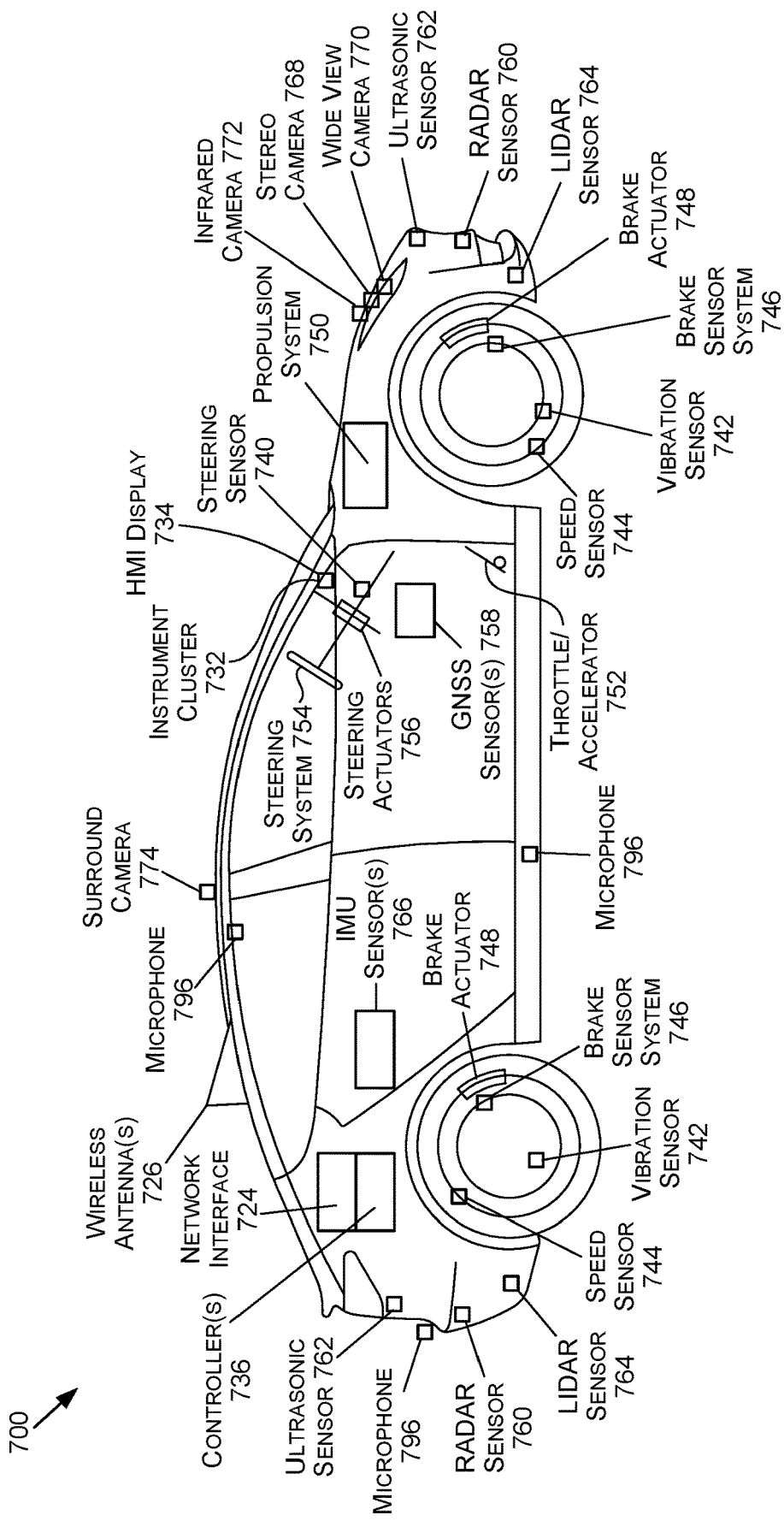
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
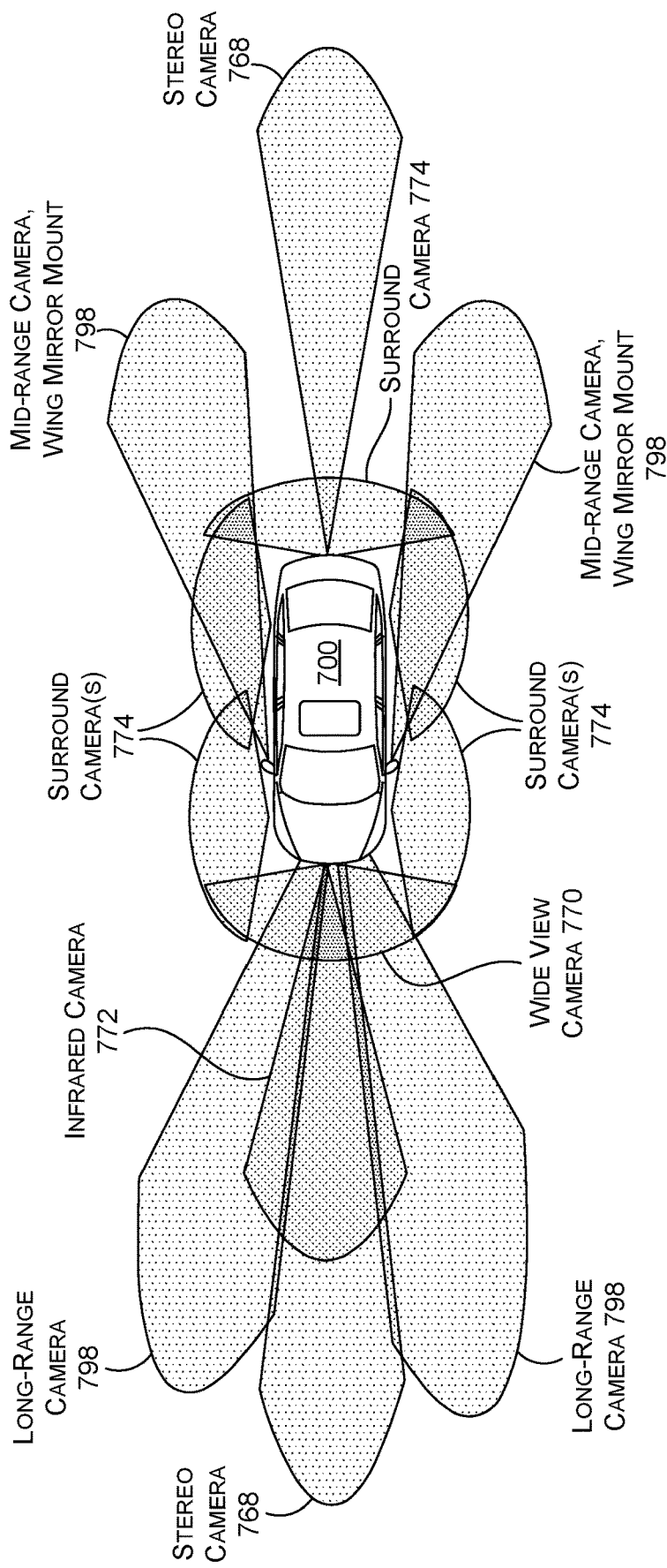
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASTL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
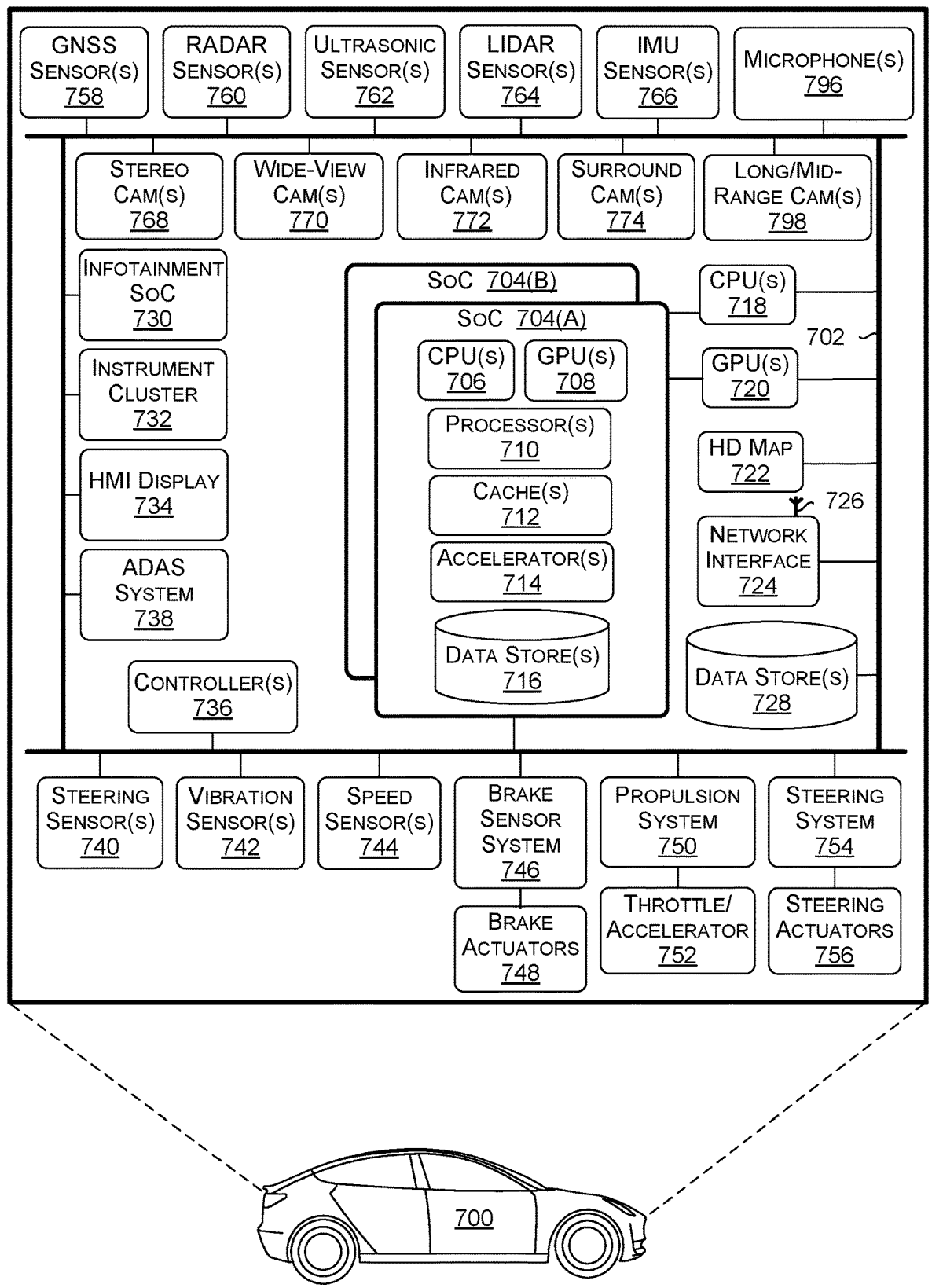
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC(s) 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIvMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
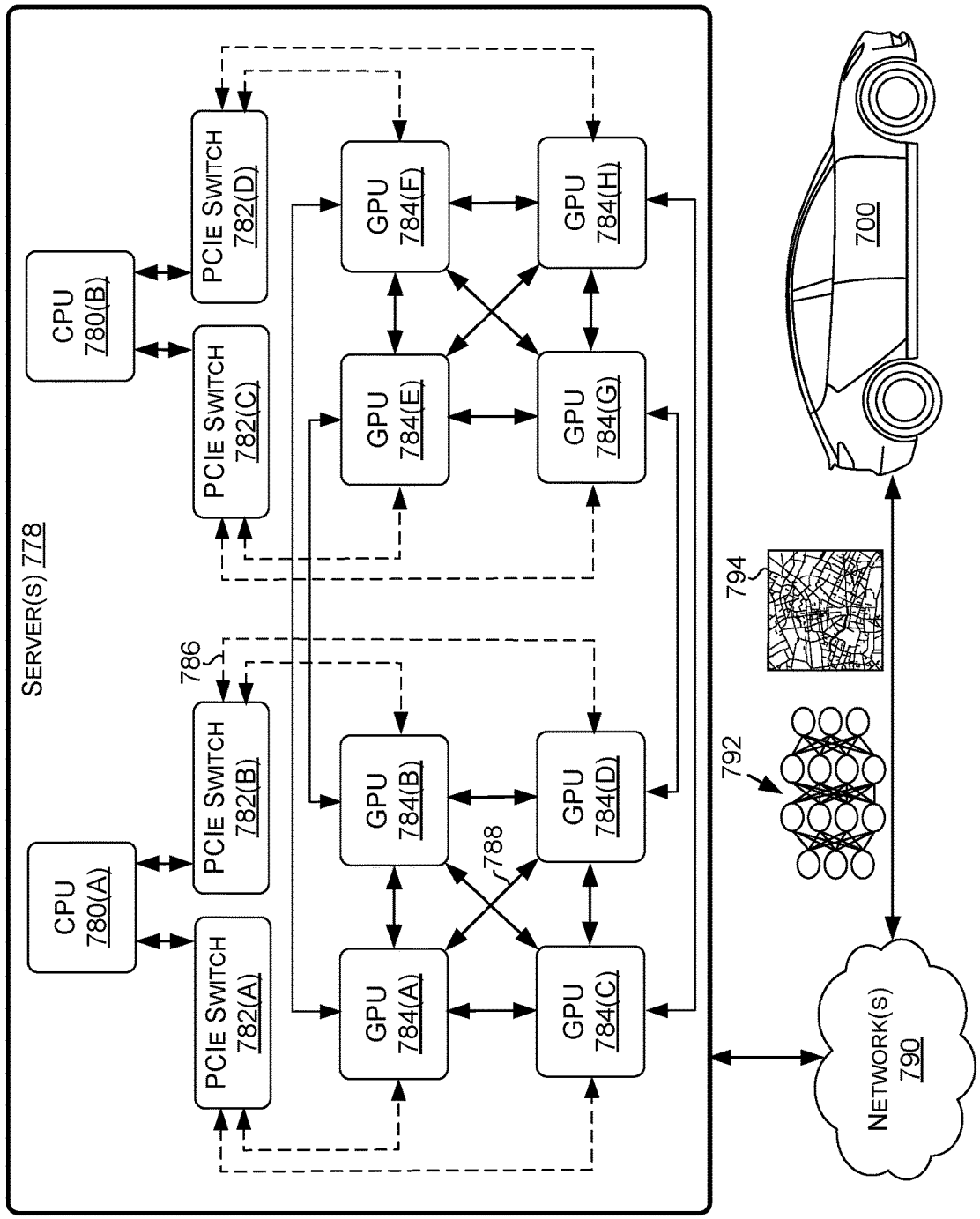
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B)

(collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
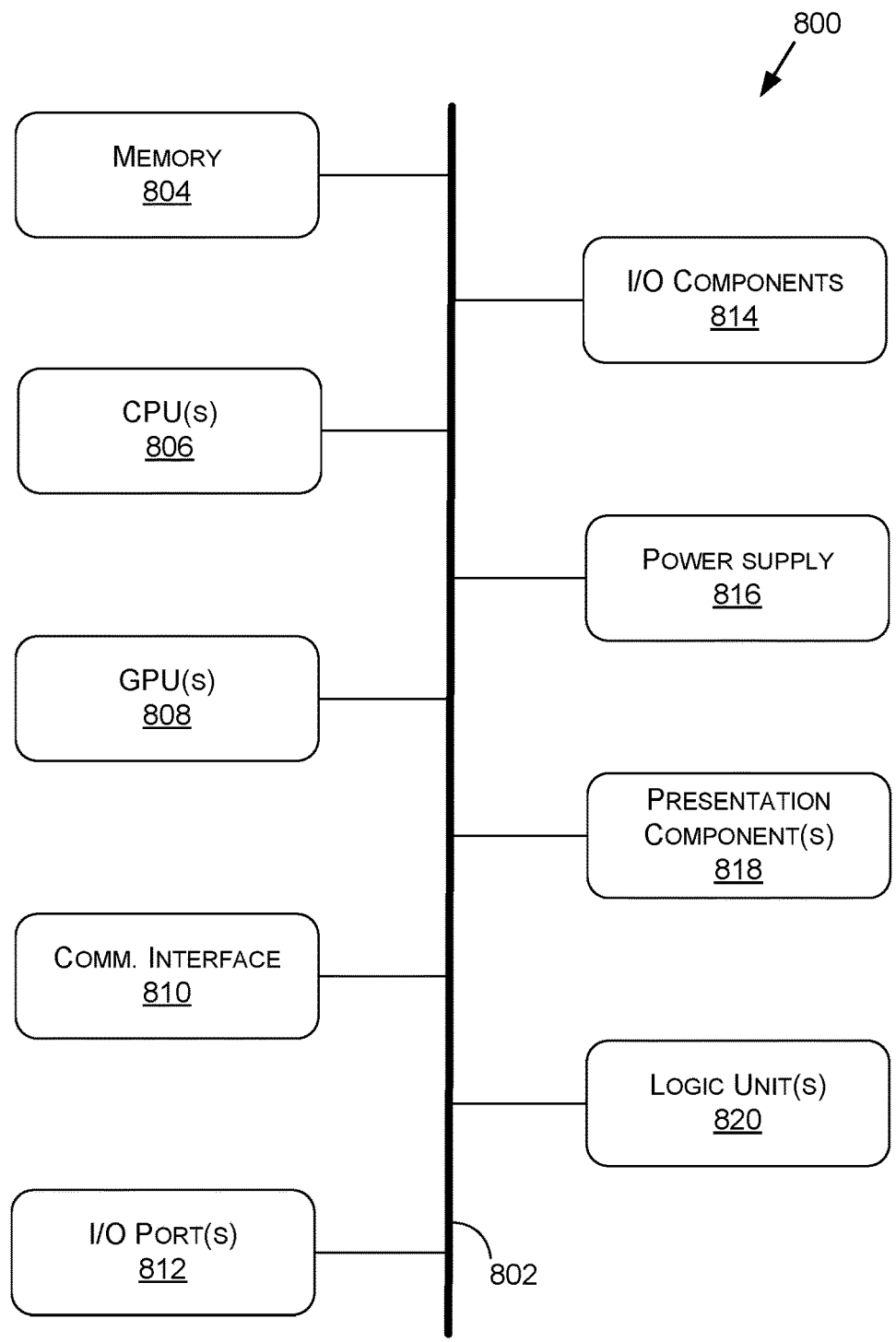
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
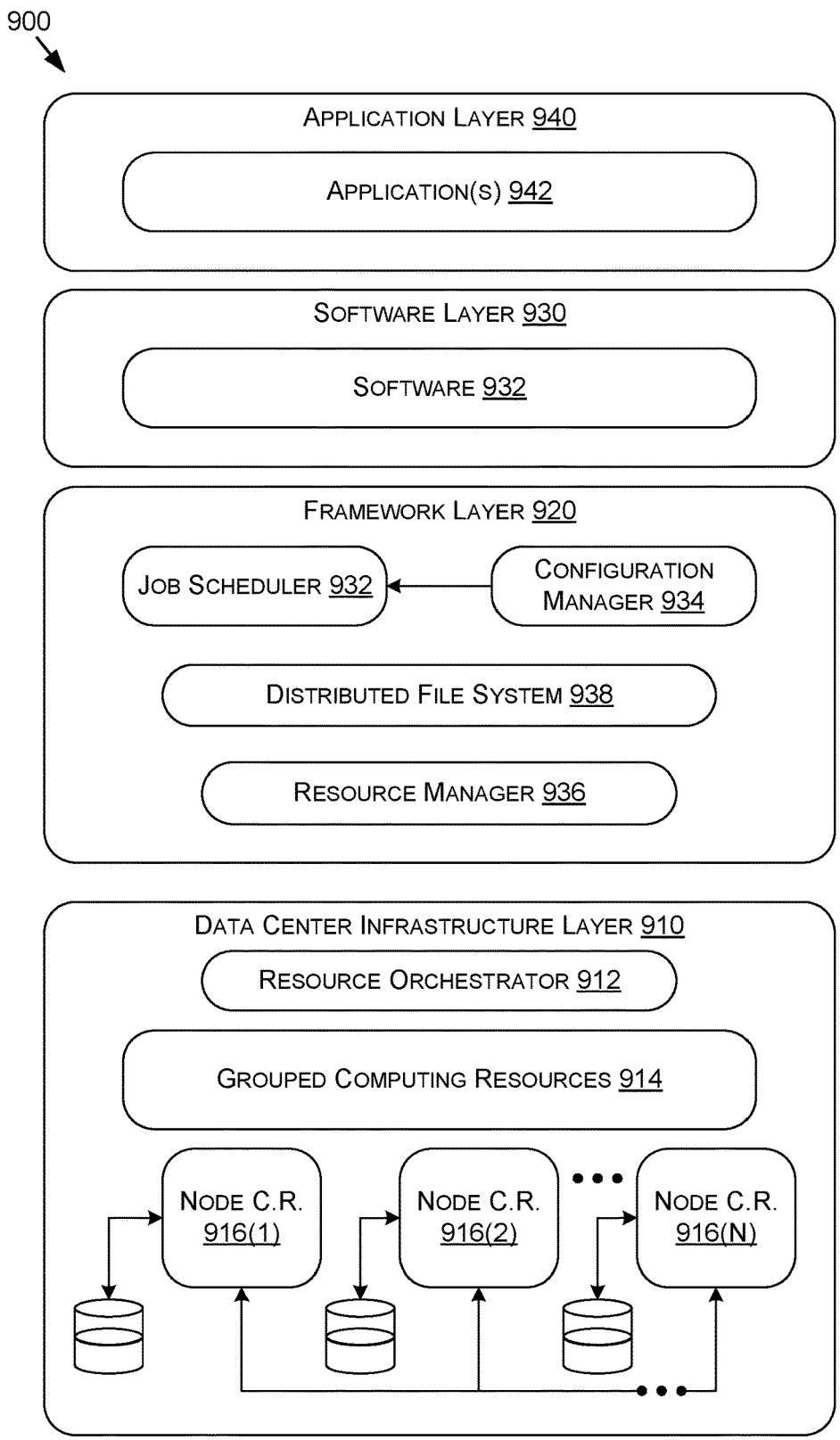
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processing units to execute operations comprising:
   receiving image data generated using one or more cameras, the image data representative of one or more images depicting one or more objects illuminated by one or more headlights of a vehicle;
   based at least on determining a first region of the one or more images that corresponds to the one or more objects, computing one or more contrast values corresponding to the first region of the one or more images;
   determining, using the one or more contrast values and for a plurality of pixels in the first region, that a ratio between luminance of the plurality of pixels and luminance corresponding to a second region of the one or more images is greater than a threshold; and
   based at least on the ratio being greater than the threshold, transmitting data to cause an adjustment to one or more parameters of the one or more headlights.

2. The system of claim 1, wherein a headlight of the one or more headlights includes a plurality of lighting elements and wherein the transmitting the data causes an adjustment to at least one lighting element of the plurality of lighting elements based at least on the at least on lighting element being associated with the first region of the one or more images.

3. The system of claim 1, wherein the one luminance corresponding to the second region comprises a global reference luminance value.

4. The system of claim 1, wherein the second region includes a set of pixels selected based at least on a proximity to the one or more objects.

5. The system of claim 1, wherein the one or more contrast values are stored in one or more channels of at least one image and the determining that the ratio is greater than the threshold includes analyzing the at least one image.

6. The system of claim 1, further comprising determining an amount of the plurality of pixels that have a contrast value that satisfies the threshold, wherein the adjustment is based at least on the amount of the plurality of pixels.

7. The system of claim 1, wherein the threshold corresponds to a reference luminance value used to compute the one or more contrast values.

8. The system of claim 1, further comprising comparing the first region to a minimum size threshold, wherein the transmitting the data is further based at least on the first region exceeding the minimum size threshold.

9. The system of claim 1, wherein the second region is larger than the first region.

10. At least one processor comprising:
    one or more circuits to receive image data generated using one or more cameras of a machine, compute contrast values corresponding to a first region of pixels in one or more images represented by the image data based at least on a determination that the first region corresponds to one or more objects, and transmit data to cause one or more operations associated with the machine based at least on an analysis of a set of the contrast values indicating a ratio between luminance associated with the first region and luminance associated with a second region of pixels in the one or more images is greater than a threshold.

11. The at least one processor of claim 10, wherein the first region includes one or more bounding shapes of the one or more objects detected in the one or more images.

12. The at least one processor of claim 10, wherein the one or more operations include modifying a subset of lighting elements of a plurality of lighting elements of one or more headlights of the machine based at least on the subset being associated with the first region.

13. The at least one processor of claim 10, wherein the analysis includes determining an amount of the pixels of the first region that have the ratio greater than the threshold, and the one or more operations are based at least on the amount of the pixels.

14. The at least one processor of claim 10, wherein the second region is selected based at least on a proximity of one or more of the pixels of the second region to the first region.

15. The at least one processor of claim 10, wherein the processor is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

16. A method comprising:
- receiving image data generated using one or more cameras, the image data representative of one or more images depicting one or more objects illuminated by one or more headlights of a vehicle;
- based at least on determining a first region of the one or more images that corresponds to the one or more objects, computing, using the image data, one or more contrast values corresponding to the first region of the one or more images;
- determining, using the one or more contrast values and for a plurality of pixels in the first region, that a ratio between luminance of the plurality of pixels and luminance corresponding to a second region is greater than a threshold; and
- based at least on the ratio being greater than the threshold, transmitting data to cause an adjustment to one or more parameters of the one or more headlights.

17. The method of claim 16, wherein a headlight of the one or more headlights includes a plurality of lighting elements and wherein the transmitting the data causes the adjustment to at least one lighting element of the plurality of lighting elements.

18. The method of claim 16, wherein the one or more contrast values are computed relative to a global reference luminance value.

19. The method of claim 16, wherein the one or more contrast values are computed relative to the second region based at least on a proximity of the second region to the plurality of pixels in the first region.

20. The method of claim 16, wherein the one or more contrast values are stored in one or more channels of at least one image.

* * * * *